United States Patent Office 2,722,478
Patented Nov. 1, 1955

2,722,478

PROCESS FOR USING TRICHLOROMETHYL THIOCYANATE AS A BIOCIDE

John F. Olin, Grosse Ile, Mich., assignor, by mesne assignments, to The Pennsylvania Salt Manufacturing Company, Philadelphia, Pa., a corporation of Pennsylvania No Drawing. Application March 27, 1952,
Serial No. 278,955

6 Claims. (Cl. 71—2.7)

This invention relates to the use of trichloromethyl thiocyanate, a new composition of matter possessing the formula $Cl_3CSCN$, as a biocide.

This compound is noteworthy in that the trichloromethyl group and the thiocyanate group are directly linked to each other. The prior art reports compounds which might be considered to have a formal relationship to the compound of this invention, in the sense that the earlier compounds contain a trichloromethyl group and a thiocyanate group in the same molecule. The relationship is quite superficial, however, since in all such compounds of the prior art, the trichloromethyl and thiocyanate groups are separated from each other by various divalent organic radicals. This marked structural difference between the present compound and the older compounds results in important differences in chemical, physical, and biological behavior.

As pointed out in my co-pending application Serial No. 154,200, filed April 5, 1950, which has matured into Patent 2,650,240, granted August 25, 1953, and of which this application is a continuation-in-part, it has been discovered that trichloromethyl thiocyanate can be prepared by reacting trichloromethanesulfenyl chloride (sometimes referred to as perchloromethyl mercaptan) with hydrogen cyanide, in accordance with the following equation:

$$Cl_3C-S-Cl + HCN \rightarrow Cl_3C-SCN + HCl$$

The trichloromethanesulfenyl chloride used as intermediate may be prepared by any means known to the art, or by modifications thereof. For example, satisfactory results may be had by chlorinating carbon disulfide in the presence of a small amount of iodine as catalyst, at ordinary temperature and for a period of time sufficient to complete the reaction. The crude product obtained therefrom may be purified by any suitable means, such as by distillation under reduced pressure.

Thus a typical preparation of trichloromethanesulfenyl chloride was conducted as follows. Iodine (3.5 g.) was dissolved in 700 g. of carbon disulfide, and about 1600 g. of chlorine in vapor phase was slowly introduced into this solution over the course of 24 hours. The reaction mixture was maintained between 15° C. and 20° C. The resulting crude material was distilled through an efficient fractionating column. There was thus obtained 1015 g. of trichloromethanesulfenyl chloride which boiled at 79–80° C. (90 mm.).

The form and/or source of the hydrogen cyanide are of no particular moment and may be varied as desired, provided that said compound is brought into contact with trichloromethanesulfenyl chloride under conditions favorable to causing the desired reaction to proceed at a reasonable rate. The reactants are preferably employed in substantially stoichiometrically equivalent ratio, although other ratios may be employed without detriment other than the usual desirability of recovering the unused portion of that reactant which is in excess.

Thus hydrogen cyanide may be used per se, either in liquid or vapor phase. If employed in vapor phase, it is recommended that the trichloromethanesulfenyl chloride likewise be in vapor phase, in order to cause intimate contact between the reactants. It is somewhat less preferable to maintain the trichloromethanesulfenyl chloride in substantially liquid phase, while passing a stream of hydrogen cyanide gas through said liquid. In the latter case, if desired, a solvent or diluent may be provided for the liquid trichloromethanesulfenyl chloride, although this is not necessary. It is of course understood that such solvent or diluent may be one in which hydrogen cyanide is soluble or insoluble, and that it preferably should be substantially inert to both reactants. In such operations, temperature and pressure relationships are usually maintained such that the hydrogen cyanide remains in vapor phase.

Hydrogen cyanide per se may also be employed in liquid phase, either in the presence or absence of a mutual solvent or diluent which preferably is substantially inert toward the reactants. When operating in the liquid phase with the reaction system at atmospheric pressure, it is preferred to maintain the temperature below the boiling point (26° C.) of hydrogen cyanide, although somewhat higher temperatures may be employed if efficient condensing means are provided. The reaction may be conducted at temperatures as low as −10° C., or lower, provided the reaction mixture is sufficiently fluid to maintain contact between the reactants. By the use of superatmospheric pressures, temperatures up to say 100° C. may be employed. Temperatures somewhat higher than 100° C. may also be employed, but are less preferred, owing to the possible decomposition of trichloromethanesulfenyl chloride and/or trichloromethyl thiocyanate at these higher temperatures. Reaction temperatures from −10° C. to 26° C. are preferred.

Hydrogen cyanide per se need not necessarily be used. In fact, it is entirely feasible and is often advantageous to generate the hydrogen cyanide within the reaction mixture, merely by the use of appropriate reagents. When this is done it is advisable that the reaction mixture shall contain, or that there be added thereto as needed, a substance which is capable of reacting with and thereby effectively destroying the hydrogen chloride which is formed by reaction of hydrogen cyanide and trichloromethanesulfenyl chloride. Such a substance is called an acid acceptor. It has been discovered that yields of trichloromethyl thiocyanate are improved by the use of an acid acceptor.

An excellent procedure comprises generating hydrogen cyanide by adding an inorganic cyanide to a lower aliphatic monobasic acid. Inorganic cyanides generally may be employed, although alkali metal and/or alkaline earth cyanides, and particularly those of sodium, potassium, and calcium are preferred. The latter are low in cost and readily available. The lower aliphatic saturated monobasic acids in general, such as formic acid, acetic acid, propionic acid, butyric acid, isobutyric acid, the various valeric acids, etc., are advantageously employed, and also simple substituted derivatives of such acids, such as chloroacetic acid and alpha-chlorobutyric acid. It is preferred to employ the aliphatic acid in considerable excess over the amount required for stoichiometric reaction with the inorganic cyanide, the excess acid serving as a solvent or diluent for reactants and product.

The desired amount of trichloromethanesulfenyl chloride is added, in a single portion or preferably in small, multiple portions, to the inorganic cyanide-aliphatic acid mixture, and this reaction system is maintained for such time and at such temperature as will cause the reaction to proceed to completion. The same considerations as to temperature and pressure apply as have already been described when hydrogen cyanide per se is employed in liquid phase.

If desired, variations in the order of mixing the ingredients of the reaction mixture may be practiced. Thus a solution of trichloromethanesulfenyl chloride in the aliphatic acid may be prepared, and the inorganic cyanide added thereto.

Using the specific case of an acetic acid-potassium cyanide-trichloromethanesulfenyl chloride reaction system illustratively, the overall reaction can be written thus:

$$Cl_3C-S-Cl+KCN \rightarrow Cl_3C-SCN+KCl$$

This equation, however, does not depict the actual reaction mechanism, which probably proceeds through a series of reactions as shown in the following equations:

(1) $CH_3COOH+KCN \rightarrow HCN+CH_3COOK$ (2) $Cl_3C-S-Cl+HCN \rightarrow Cl_3C-SCN+HCl$ (3) $CH_3COOK+HCl \rightarrow CH_3COOH+KCl$ It will be noted that potassium acetate, formed in Reaction 1, destroys hydrogen chloride in Reaction 3 by conversion of the latter to potassium chloride, that is, potassium acetate functions as an acid acceptor. Potassium chloride is essentially insoluble in the reaction mixture, this insolubility assisting in causing the reaction to proceed to the right. Destruction of hydrogen chloride is beneficial in aiding Reaction 2 to proceed to the right.

Another means of generating hydrogen cyanide comprises adding an acidic substance, such as an inorganic or organic acid, to an aqueous solution or suspension of inorganic cyanide. This substance should of course possess sufficient acid strength that it is capable of reacting with the inorganic cyanide. It is advisable that said acidic substance be added in slight excess in order to maintain the reaction mixture in acid condition. This is desirable because trichloromethanesulfenyl chloride is more or less rapidly destroyed in alkaline solution, probably by hydrolysis.

To the acidic aqueous solution of "generated" hydrogen cyanide there is added the desired quantity of trichloromethanesulfenyl chloride, which may be added in a single portion, or preferably in small, multiple portions. As the reaction proceeds, a basic material is slowly added in order to serve as acid acceptor for the hydrogen chloride formed in the reaction. Various basic materials may be used. Alkali metal hydroxides such as sodium hydroxide are excellent. The addition of base should not be large enough to allow the reaction mixture to become alkaline. During the course of the reaction, the system is preferably maintained at comparable conditions of temperature and pressure as when hydrogen cyanide per se is employed in liquid phase. The time of reaction should be sufficient for the reaction to be completed.

In a preferred practice, potassium and/or sodium cyanide is added to an excess of glacial acetic acid, the temperature of the mixture preferably being below 20° C. so that hydrogen cyanide will not escape. The resulting slurry is stirred while a stoichiometric amount of trichloromethanesulfenyl chloride is slowly added thereto. The system is maintained at atmospheric pressure, and temperature conditions are maintained between −10° C. and 26° C. by means of external cooling. Condensing means are provided in order to return to the system such small amounts of hydrogen cyanide as might otherwise escape. The time of addition of the chloride depends more upon efficiency of external cooling than upon reaction rate, that is, the chloride is added at such a rate that the temperature of the reaction mixture does not exceed 26° C. The time of addition may vary from an hour or two up to several hours, depending on efficiency of cooling. If desired, the reaction mixture may be stirred for an hour or two after the chloride has been added, maintaining temperature conditions substantially the same as during said addition, in order to assure completeness of reaction. The trichloromethyl thiocyanate formed by reaction is soluble in acetic acid, while the potassium chloride is insoluble. The mixture is filtered in order to remove potassium chloride. The filtrate thus obtained is fractionally distilled under reduced pressure. The desired product is thus separated from acetic acid and also from any by-products formed in the reaction.

The following examples illustrate the production of the new compound. Numerous modifications will become apparent to persons skilled in the art upon becoming familiar herewith.

EXAMPLE 1

A solution of hydrogen cyanide in acetic acid was prepared by gradual addition of 163 grams (2.5 moles) of powdered potassium cyanide to 500 cc. of glacial acetic acid which was contained in a 3 liter 3-neck flask provided with a dropping funnel, stirrer, and condenser. During this addition, the mixture was agitated and externally cooled, thus maintaining its temperature below 15° C. With continued cooling, 465 grams (2.5 moles) of trichloromethanesulfenyl chloride was slowly added in 70 minutes, the temperature of the reaction mixture being maintained between 5° C. and 15° C. After the chloride had all been added, the resulting slurry was stirred for an additional 2.5 hours, temperature being maintained between 5° C. and 10° C. The precipitate of potassium chloride which formed in the reaction was filtered off and the filtrate was distilled through a short, packed column. Trichloromethyl thiocyanate (195 grams, a yield of 44%) was collected at 44–49° C. (11 mm.). The product was a pale yellow fluid, irritating and lachrymatory.

EXAMPLE 2

The same apparatus was used as in Example 1.

A solution of 293 grams (4.5 moles) of potassium cyanide in 700 cc. of water was cautiously acidified with 360 cc. of concentrated hydrochloric acid. During the acidification the temperature of the mixture was held below 10° C. by means of external cooling. Trichloromethanesulfenyl chloride (744 grams or 4.0 moles) was gradually added during 1.5 hours. The mixture consisting of two liquid phases was stirred and cooled; the temperature remained below 10° C. Then a solution of 180 grams (4.5 moles) of sodium hydroxide in 680 cc. of water was added with vigorous stirring during 3 hours, the temperature of the mixture being held below 10° C. in the usual manner. Throughout the addition of the caustic, the pH of the mixture remained acidic. The lower layer was separated from the upper aqueous layer, washed with water, dried with calcium chloride, and distilled. Trichloromethyl thiocyanate, collected at 92–3° C. (80 mm.), weighed 207 grams (29% yield).

EXAMPLE 3

A mixture of 7.5 moles of potassium cyanide, 2000 cc. of glacial acetic acid, and 5.0 moles of trichloromethanesulfenyl chloride was reacted as in Example 1. The resulting slurry was filtered and the filtrate was diluted with 1500 cc. of water. This caused separation into two layers. The layers were separated and the upper layer was extracted with three portions of chloroform. This chloroform was combined with the original lower layer. The resulting solution was washed with water, dried with calcium chloride, and distilled. Trichloromethyl thiocyanate, collected at 92–3° C. (80 mm.), weighed 386 grams (44% yield).

EXAMPLE 4

A solution of three moles of trichloromethanesulfenyl chloride in one liter of glacial acetic acid was cooled to 0° C. With stirring 3 moles of powdered sodium cyanide was gradually added during 4 hours, the temperature of the reaction mixture being maintained between 0° C. and −3° C. by means of external cooling. Stirring and cooling were continued for ½ hour after addition of the sodium cyanide was completed. The mixture was allowed to stand overnight at about 10° C. It was then filtered to remove sodium chloride, and the filtrate was distilled. Trichloromethyl thiocyanate, collected at 90–93° C. (80 mm.), weighed 173 grams (33% yield).

Trichloromethyl thiocyanate is a pale yellow to straw-colored mobile liquid which possesses a pungent and irritating odor. It is lachrymatory. It is soluble in such organic solvents as methanol, ethyl ether, acetone, ethyl acetate, benzene, and hexane, but is substantially insoluble in water. Certain other important physical properties have been determined as follows:

| | |
|---|---|
| Boiling point | 44–45° C./11 mm. |
| Boiling point | 64–65° C./25 mm. |
| Boiling point | 164.5° C./740.8 mm. |
| Freezing point | 2.5° C. |
| Specific gravity | 1.585/20° C. |
| Specific gravity | 1.580/25° C. |
| Refractive index | 1.5222/20° C. |
| Viscosity | 2.55 centipoises/25° C. |
| Specific heat | 0.262 cal./g./° C. at 39° C. |

The chemical composition was determined by analysis for nitrogen, sulfur, and chlorine:

| | N, percent | S, percent | Cl, percent |
|---|---|---|---|
| Found | 7.5 | 18.7 | 58.5 |
| Theoretical for Cl$_3$C—SCN | 7.9 | 18.1 | 60.3 |

The compound was subjected to infrared analysis. It exhibited the absorption characteristics of organic thiocyanates and not those of organic isothiocyanates.

The compound possesses marked utility and versatility in the field of pest control. It is an excellent fumigant, as in the fumigation of grain for example, and it is highly effective when used against pests such as undesirable fungi, bacteria, and nematodes, such as soil nematodes. It exhibits phytotoxic activities, and may be used as a herbicide.

Examples of such uses follow:

EXAMPLE 5

Soil in 3-quart jars was treated with trichloromethyl thiocyanate at the following respective concentrations: 0.1 ml., 0.2 ml., 0.4 ml., 0.8 ml., and 1.6 ml. per jar. The soil was badly infested with root-knot nematodes (*Heterodera marioni*).

In each test, the material was pipetted into a hole extending to about half the depth of the soil, and soil was then brushed into the hole. The jar was sealed and allowed to stand at ordinary room temperature for 9 days. The soil was then transferred to an 8-inch flower pot. A 5-day aeration period was allowed, following which 10 small tomato seedlings were transplanted in the pot.

At the end of 21 days, the roots of the plants were carefully examined for gall formation. No galling occurred at the above 0.8 ml. and 1.6 ml. concentration levels, light galling occurred at 0.4 ml., and there was considerable galling at the lower concentration levels.

EXAMPLE 6

Slide-spore germination fungicidal tests gave complete inhibition of germination of spores of the peach-rot fungus (*Sclerotinia fructicola*) and of spores of the apple bitter-rot fungus (*Glomerella cingulata*). These tests were conducted in accordance with the American Phytopathological Society method, except that they were continued for three days instead of only one day.

EXAMPLE 7

Potted young Dwarf Horticultural bean plants were placed in wide-mouthed, 5-gallon bottles. Various volumes of trichloromethyl thiocyanate were then introduced, and the bottles were tightly sealed. The plants were exposed to the vapors of the active ingredient for 41 hours. At a concentration level of 1:19,000,000, the plants were severely injured, and at a level of 1:38,000,000 they were less severely injured.

Control plants exposed in similar bottles for 41 hours were normal.

This experiment, confirmed by other experiments, demonstrates the high phytotoxicity of trichloromethyl thiocyanate.

EXAMPLE 8

Solid formulations of trichloromethyl thiocyanate and of chloropicrin, respectively, were prepared as follows. Varying amounts of the respective compounds were pipetted onto 2 g. portions of fuller's earth contained in bacteriological culture tubes (10 mm. by 125 mm.) in such a way that the liquids were delivered in a thin stream along the sides of the tubes. The tubes were tightly sealed and mechanically rolled in order to distribute the active ingredients evenly in the carrier.

The seed-killing properties of these active ingredients were compared in the following manner. Wooden flats (9" long by 7" wide by 3.5" deep) filled to a depth of about 2.5" with moist sandy loam were sown thickly and uniformly, and at a depth of about 0.5 inch, with Clinton oat-seed. The soil in each flat was tamped, and two lengthwise furrows 1" deep, 4" apart, and 1.5" from the sides, were made. On the day of sowing, a carrier-active ingredient formulation prepared as described above was evenly distributed in the furrows of a flat, and the furrows were filled with soil.

Four replicate flats were thus prepared at each dosage of each active ingredient. The respective dosages of the respective active ingredients were 38, 76, 152, and 304 pounds per acre; the carrier was present in constant amount, namely, 385 pounds per acre. Four flats sown with oats but treated with no herbicide served as controls. All the flats were kept outdoors, precautions against washing by rain being observed, and they were sprinkled with water as needed. Observations made 7 days after the flats were prepared are summarized in Table 1.

*Table 1*

| Dosage of active ingredient | Trichloromethyl thiocyanate | Chloropicrin |
|---|---|---|
| None (controls) | Good plant development over entire flats. | Good plant development over entire flats. |
| 38 lbs./acre | No growth in 1.5" bands over furrows; plants between bands about 3.5" high. | As controls. |
| 76 lbs./acre | No growth in 2.5" bands over furrows; plants between bands varied, from just emerging to 1" high. | Growth over entire flats but somewhat more sparse than controls; plants about 1–1.5" high. |
| 152 lbs./acre | Flats almost bare. | About as at 76 lbs./acre. |
| 304 lbs./acre | No growth. | No growth. |

EXAMPLE 9

Flats were prepared and sown with Clinton oats as in the preceding example, but furrows were not made. Instead, a hole about 1" deep was made in the soil at the center of each flat. Varying amounts of trichloromethyl thiocyanate and of chloropicrin, respectively, were pipetted as undiluted liquids into such holes of a group of flats; soil was then placed in the holes.

Using this procedure, duplicate flats were prepared at each dosage of each active ingredient, the respective dosages of the respective active ingredients being 38, 76, 152, and 304 pounds per acre. Two flats containing seed but no active ingredient served as controls. All the flats were maintained for 8 days under the same conditions as described in the preceding example. Table 2 shows observations made at that time. Capital letter A designates trichloromethyl thiocyanate in the table; B designates chloropicrin.

Table 2

| Active ingredient | Dosage, lbs./acre | Diameter of inhibition zones, inches | | Percent germination in inhibition zones [1] | | Height of plants outside inhibition zones, inches | |
|---|---|---|---|---|---|---|---|
| | | Duplicate flat | | Duplicate flat | | Duplicate flat | |
| | | 1 | 2 | 1 | 2 | 1 | 2 |
| None | 0 | 0 | 0 | 100 | 100 | 4 | 4 |
| A | 38 | 4 | 4 | 0 | 0 | 4 | 4 |
| B | 38 | 0 | 0 | 100 | 100 | 4 | 4 |
| A | 76 | 5 | 5 | 0 | 0 | 3.5 | 3.5 |
| B | 76 | 0 | 0 | 100 | 100 | 4 | 4 |
| A | 152 | 7 | 7 | 0 | 0 | 3.5 | 3.5 |
| B | 152 | (2) | (2) | 20 | 90 | 2 | 4 |
| A | 304 | [3] 7 | [3] 7 | 0 | 0 | 3 | 3 |
| B | 304 | 1.5 | 2 | 20 | 35 | 2–3 | 2–3.5 |

[1] That is, percent germination of plants in inhibition zones as compared with plants in control flats.
[2] Indefinite.
[3] 7" (maximum) across width of flats, but 8" lengthwise.

Trichloromethyl thiocyanate has been found to possess excellent bactericidal activity against a variety of bacteria, for example, against *P. tumefaciens* and *S. myxococoides*.

From the foregoing it will be appreciated that for biocidal purposes very low concentrations of the active ingredient are effective for terminating the life cycle of various undesirable forms of plant and animal life. The active ingredient may be applied to such forms of life by any convenient means, such as for example, by the use of non-aqueous solutions, or by the use of suspensions, emulsions, and dispersions, aqueous or non-aqueous, or by the use of the active ingredient without diluent.

Compositions containing the active ingredient are applied in any desired form, such as in the form of a solid, for example by dusting, or in the form of a liquid, for example by spraying, or in the form of a vapor, for example during fumigation.

Compositions may be formulated by admixing the active ingredient with any desired liquid or solid carriers such as any of the finely divided solid carriers known in the dusting art, which are preferably of large surface area, such as a clay, for example, fuller's earth, pyrophyllite, talc, bentonite, kieselguhr, diatomaceous earth, etc. Any of the commercial clays available on the market in finely divided form are highly satisfactory, and particularly those which are normally employed as insecticide carriers. Commercial clays, it will be understood, are generally identified by trade names (reflecting the source and mode of processing) of which Homer Clay, Celite, and Tripoli may be mentioned as typical.

Non-clay carriers which may be formulated with the active material include, for example, sulfur, volcanic ash, calcium carbonate, lime, by-product lignin, lignocellulose, flour such as wood, walnut shell, wheat, soy bean, potato, cotton seed, etc.

Any desired mixture may be prepared by any suitable method. Thus the active material in liquid form, including solutions, dispersions, emulsions and suspensions thereof, may be admixed with the finely divided carrier in amounts small enough to preserve the requisite free-flowing property of the final dust composition. Or excess liquid may be removed such as by vaporization, for example, under reduced pressure.

When solid compositions are employed it is desirable that the composition be in finely divided form. Preferably the dust containing the active ingredient should be sufficiently fine that substantially all will pass through a 50-mesh sieve, and more particularly through a 200 mesh sieve.

For spray application the active ingredient may be dissolved or dispersed in a liquid carrier. Examples of liquid carriers are water, various oils, and various organic solvents such as for example those abovementioned solvents in which trichloromethyl thiocyanate is soluble. Suitable oils include those of petroleum, animal, vegetable, or synthetic origin, such as kerosene, fuel oil, lubricating oil, soy bean oil, linseed oil, castor oil, sperm oil, cod liver oil, etc.

In general, the choice of the particular liquid carrier employed may be guided somewhat by prevailing circumstances, such as its availability and cost, and its solubility or dispersion characteristics toward the active ingredient. Thus spray formulations comprising the active ingredient in the form of a suspension, dispersion, or emulsion in aqueous or non-aqueous media may be employed, or such formulations comprising said ingredient in the form of a non-aqueous solution may likewise be employed.

Emulsions or dispersions of the active ingredient in the liquid carrier may be prepared by agitation of the active ingredient with the carrier. If desired, this may be done at the time of spraying. Preferably, however, the agitation should take place in the presence of an emulsifying or dispersing agent (surface-active agent) in order to facilitate the preparation of said emulsion or dispersion. Emulsifying and dispersing agents are well-known in the art, and include, for example, fatty alcohol sulfates, such as sodium lauryl sulfate, aliphatic or aromatic sulfonates, such as sulfonated castor oil or the various alkaryl sulfonates (such as the sodium salt of monosulfonated nonyl naphthalene), and non-ionic types of emulsifying or dispersing agents such as the high molecular weight alkyl polyglycol ethers or analogous thioethers, such as the decyl, dodecyl, and tetradecyl polyglycol ethers and thioethers containing from 25 to 75 carbon atoms.

For convenience, the emulsifying or dispersing agent may be mixed with the active ingredient prior to admixture with the carrier, and the preparation of the emulsion or dispersion is accomplished at the place where the spraying is to be undertaken merely by agitating said mixture with the carrier, particularly when aqueous. The active ingredient, if not soluble in the carrier in the concentration desired, may be dispersed as such, or may be dissolved in a solvent, and emulsified by agitation with the carrier. This applies particularly when both water and oil are employed in the carrier.

The concentration of surface-active agent in the final emulsion or dispersion should be sufficient to make the phases readily dispersible, and in general for this purpose from 0.02% to 2% is satisfactory. Any desired additional amount may be added such as for adjuvant purposes, as will be understood. Thus, if the surface-active agent is to be premixed with the active ingredient, the selected relative proportions of the two will largely depend upon the purposes in mind. For mere purposes of forming spray emulsions or dispersions, mixtures containing a surface-active agent to the extent of from about 1% to about 25% by weight of active ingredient are satisfactory. However, it is to be understood that the proportion may be varied over a wide range, particularly if pronounced adjuvant effects are desired.

Emulsifying and dispersing agents usually also possess the properties of wetting agents, and in this capacity greatly assist in bringing about efficient contact between liquid and the object which is to be treated. This is particularly true when a plant is to be treated.

The use, if desired, of adjuvants, such as wetting agents and/or humectants, is also contemplated in connection with solutions or dispersions of the active ingredient, such as aqueous dispersions. Any suitable wetting agent and/or humectant may be employed for this purpose, such as the wetting agents more particularly referred to herein. Examples of humectants are glycerine, diethylene glycol, ethylene glycol, polyethylene glycols generally, and well known sugar-containing mixtures, such as corn syrup and honey.

For adjuvant purposes, any desired quantity of wetting agent may be employed, such as up to 250% or more based on active ingredient. For wetting purposes, the amount of adjuvant used may be considered to be that required to impart the desired wetting qualities to the spray solution as formulated, such as approximately 0.05% by weight of the spray solution. The use of considerably larger amounts is not based upon wetting properties, although present, but is a function of the physiological behavior of the wetting agent after spraying.

It should be considered that once the mixture has been sprayed, such as upon plants, soil, grain, lumber, etc., the concentration of wetting agent existing upon the sprayed surface is in no sense a function of the concentration existing in the original spray mixture. Thus, evaporation might concentrate the wetting agent considerably, or the presence of moisture on the sprayed surface might considerably dilute this agent.

Wetting agents appear to serve the purposes of aiding in penetration by the active ingredient and of spreading of the active ingredient over the treated area.

Although the active ingredient may be applied in concentrated form, it is usually desirable to employ liquid or solid formulations, for example as discussed above.

For nematocide applications in the field, any method of application known to the art may be employed, with the view of contacting the nematodes with trichloromethyl thiocyanate in either the liquid phase or the vapor phase or both. It is common practice, for example, to apply soil fumigants through the expedient of depositing the fumigant at more or less regularly spaced points below the surface of the soil, whereupon the active ingredient penetrates the soil between and around such points, largely in the vapor phase. Trichloromethyl thiocyanate is excellently suited for such purposes, in view of its favorable vapor pressure properties at soil temperatures. Similar considerations apply to other fumigation procedures, for example, the fumigation of grain in storage. Vapor phase carriers may be employed if desired; this applies particularly to fumigation practices.

Other substances than the carrier and/or surface-active agent may be included in the solid or liquid formulations, if desired, to bring about various physical improvements such as the prevention of lumping during storage, or improvement in respect to coverage, moisture adsorption, adherence, etc. Likewise, other substances may be included in said formulations, if desired, to accomplish various physiological results. For example, it may at times be expedient to include singly or in combination substances such as other fungicides, bactericides, nematocides, or herbicides. The preparation of such additions and the materials added do not require elaboration, but will suggest themselves to persons skilled in the art upon becoming familiar herewith.

The term "plants" as used in the claims is intended to include any portions thereof, such as the roots, stems, leaves and seeds.

Having described the invention, and recognizing that modifications may be practiced which fall within its scope and spirit, I do not wish to be limited except by the scope of the claims.

I claim:

1. A process for terminating the life cycle of nematodes, fungi, bacteria, and plants, comprising exposing the same to lethal concentrations of trichloromethyl thiocyanate.

2. A process for terminating the life cycle of nematodes comprising exposing said nematodes to lethal concentrations of trichloromethyl thiocyanate.

3. A process for terminating the life cycle of fungi comprising exposing said fungi to lethal concentrations of trichloromethyl thiocyanate.

4. A process for terminating the life cycle of plants comprising exposing said plants to lethal concentrations of trichloromethyl thiocyanate.

5. A process for treating soil for terminating the life cycle of nematodes contained therein which comprises bringing into contact with said soil trichloromethyl thiocyanate.

6. A process for terminating the life cycle of bacteria comprising exposing the same to lethal concentrations of trichloromethyl thiocyanate.

References Cited in the file of this patent

UNITED STATES PATENTS

| Number | Name | Date |
|---|---|---|
| 2,024,098 | Heckert | Dec. 10, 1935 |
| 2,339,050 | Carson | Jan. 11, 1944 |
| 2,368,601 | Torley | Jan. 30, 1945 |
| 2,572,564 | Himel et al. | Oct. 23, 1951 |

OTHER REFERENCES

"Auxiliary Gases and Hydrocyanil Gas," by F. S. Pratt et al., in Journal of Economic Entomology, at p. 1031, December 1933.